United States Patent [19]
Dang et al.

[11] Patent Number: 5,850,277
[45] Date of Patent: Dec. 15, 1998

[54] MOVIE CAMERA HAVING ADJUSTABLE SHUTTER

[75] Inventors: Brian C. Dang, Burbank; Albert K. Saiki; Eric M. Chang, both of Los Angeles, all of Calif.

[73] Assignee: Panavision, Inc., Woodland Hills, Calif.

[21] Appl. No.: 655,617

[22] Filed: May 30, 1996

[51] Int. Cl.[6] .................................................. G03B 9/10
[52] U.S. Cl. ........................................... 352/214; 352/206
[58] Field of Search .................... 352/208, 209, 352/214, 215, 216, 217, 218

[56] References Cited

U.S. PATENT DOCUMENTS

| | | | |
|---|---|---|---|
| 3,300,271 | 1/1967 | Yamamoto | 352/214 |
| 4,022,525 | 5/1977 | Boudouris | 352/187 |
| 4,355,279 | 10/1982 | Younge | 324/161 |
| 4,576,456 | 3/1986 | Okino et al. | 352/216 |
| 4,743,108 | 5/1988 | Vogel et al. | 352/216 |
| 4,889,424 | 12/1989 | Saiki | 352/216 |
| 5,019,773 | 5/1991 | Sugiura et al. | 324/166 |
| 5,072,162 | 12/1991 | Sato et al. | 318/268 |
| 5,137,346 | 8/1992 | Sattler et al. | 352/216 |

FOREIGN PATENT DOCUMENTS

| | | |
|---|---|---|
| 97 10 8036 | 9/1997 | European Pat. Off. . |
| 60-236586 | 4/1986 | Japan . |
| 29 47 333 A1 | 4/1981 | Netherlands . |

*Primary Examiner*—Safet Metjahic
*Assistant Examiner*—John Chizmar
*Attorney, Agent, or Firm*—Lyon & Lyon LLP

[57] ABSTRACT

A shutter system for a movie camera or the like for controlling the film exposure including a main shutter wheel rotatably mounted on main drive shaft driven by a first motor and at least one adjustable shutter wheel positioned adjacent to and coaxially rotating with the main shutter wheel, the adjustable shutter wheel being mounted on a secondary shaft independently driven by a second motor. Both the aperture (determined by the relative positions of the shutter wheels of the main shutter wheel and adjustable shutter wheel) and the shutter speed are set by a controller which regulates the speed of each of the motors.

25 Claims, 7 Drawing Sheets fig. 1 fig. 4 fig. 6 fig. 5

*FIG. 10*A  *FIG. 10*B fig. 11

# MOVIE CAMERA HAVING ADJUSTABLE SHUTTER

BACKGROUND OF THE INVENTION

The field of the present invention relates to motion picture cameras and in particular to shutter mechanisms for movie cameras or the like.

A motion picture camera exposes film by allowing light to pass through a lens opening and then through a shutter aperture. The shutter rotates at a speed synchronous with that of the passing film frames. One form of prior art shutter is shown in FIGS. 1a and 1b in U.S. Pat. No. 4,889,424 illustrating what will be called the "stationary" or main shutter wheel and the adjustable shutter wheel. Both the main shutter wheel and the adjustable shutter wheel are generally of a bow tie-like shape and rotate about a shaft on an axis at a speed which is synchronous with that of the film. Inside the camera, the film is positioned to be exposed to light through the apertures between the two opposing shutter elements or extensions. As the main shutter wheel rotates, light passes through the camera lens onto the film frame which is aligned behind the shutter aperture for the amount of time the aperture is so aligned allowing the film to be exposed. The film is advanced from one frame to the next frame while the light path is interrupted by the shutter elements. Thus two frames of film are exposed and advanced for each revolution of the shutter.

The second shutter wheel, the adjustable shutter wheel, is provided to control exposure. The adjustable shutter wheel rotates with the main shutter wheel and therefore also rotates at a synchronous speed with the film. The adjustable shutter wheel has two shutter extension members which may cover some portion of the two apertures between main shutter wheel elements. By an adjustment mechanism, the adjustable shutter wheel may be pivotally adjusted relative to the main shutter wheel. By pivoting the adjustable shutter wheel relative to main shutter wheel, a portion of the arc of each aperture may be covered by the rotating shutter extensions.

There have been several mechanisms devised for pivoting the adjustable shutter wheel relative to main shutter wheel. U.S. Pat. No. 4,889,424 discloses a mechanical gearing arrangement which permits manual adjustment of the adjustable shutter wheel while the camera is running or not. The mechanical gearing could be mechanized to be actuated by a motor.

U.S. Pat. No. 5,137,346 discloses a similar adjustable shutter system by providing an adjustment motor inside the drive shaft. The adjustment motor can be separately operated to adjust the position of the adjustable shutter relative to the main shutter. Being located inside the rotating drive shaft, the adjustment motor rotates with the shaft and therefore requires the use of a slip ring to receive its power and control signals. The slip ring connections can produce noise and experience undesirable wear characteristics.

SUMMARY OF THE INVENTION

The present invention is directed to an improved camera with a main shutter and an adjustable shutter driven by a pair of motors mounted to drive concentric shafts, the main shutter being mounted on one shaft and the adjustable shutter being mounted on the other shaft. Relative position of the shutters establishes a shutter aperture for the camera. Sensors, preferably high accuracy optical encoders, are provided to determine speed and position of each shaft. A controller receives the signal from the encoders and adjusts relative position (i.e. the shutter opening) by controlling relative speeds of the two motors.

DETAILED DESCRIPTION OF THE PREFERRED EMBODIMENTS

Figure 1:
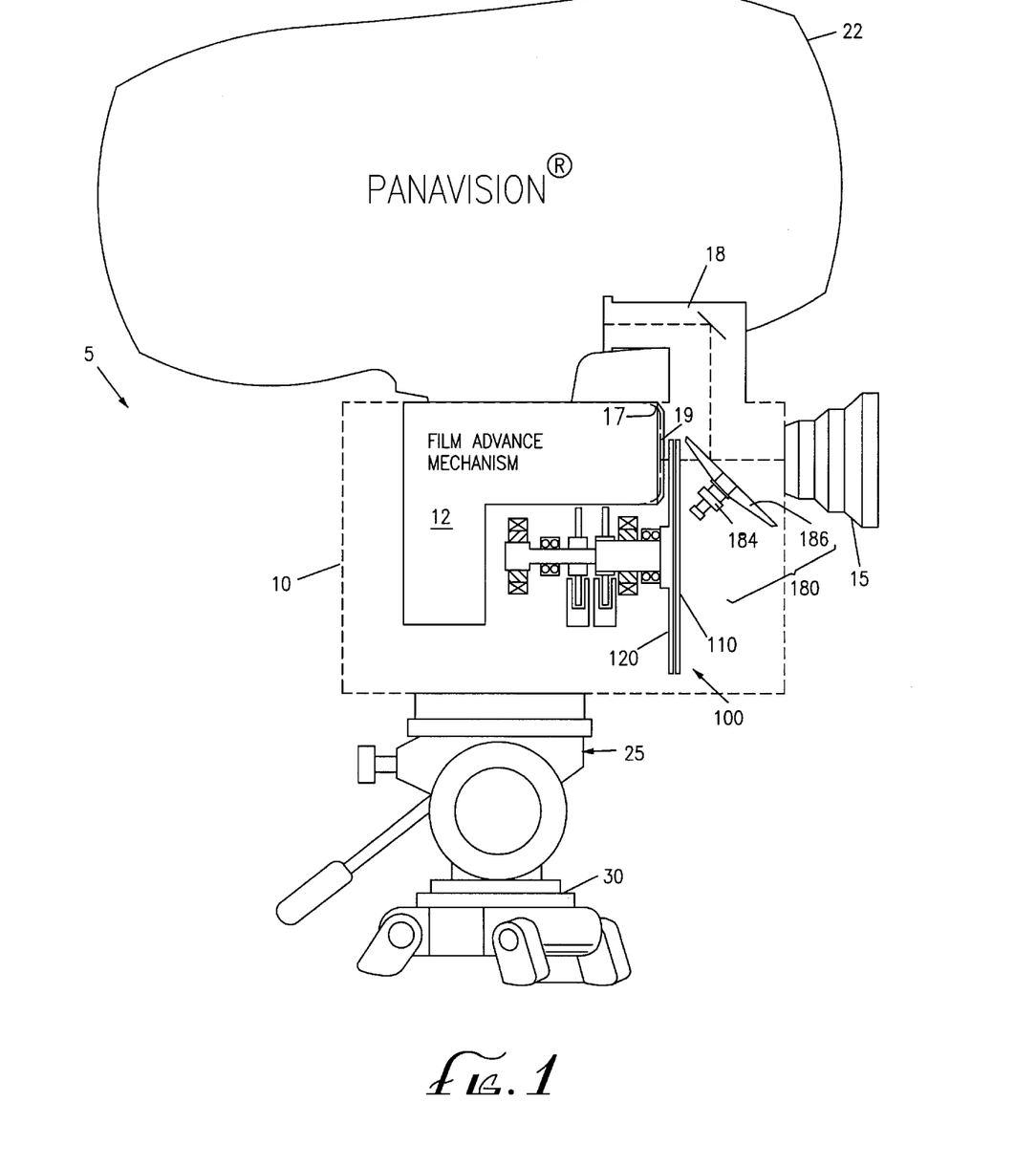
FIG. 1 is a diagrammatic plan view of a camera system according to a preferred embodiment of the present invention.

The preferred embodiments will now be described with respect to the drawings. FIG. 1 diagrammatically illustrates a movie camera system 5 comprising a camera 10 mounted on support head (illustrated as for example a fluid head 25 for tilting and panning the camera 10), which is in turn mounted on a positioning mechanism (illustrated as for example a tripod 30, but may be a crane, dolly or other movable support). Film 17 is provided from a film magazine 22 mounted on the camera 10. A primary lens 15 mounts to the front of the camera for focusing the image onto the film plane 19. A matte box assembly (not shown) is mounted to support filters in front of the camera lens to produce the high quality picture or special coloring or other visual effects desired for the motion picture.

The camera 10 includes a film advance mechanism 12 which advances the film 17 (shown by a dashed line in FIG. 1) from the film magazine 22 frame-by-frame at a desired film speed behind the shutter assembly 100. The main shutter 110 and the adjustable shutter 120 are driven by a drive system described in detail below. The shutter assembly 100 is comprised of a main shutter 110 and an adjustable shutter 120 which are mounted on and rotate with respective drive shafts 140, 160. The position of the adjustable shutter 120 is allowed certain adjustment with respect to the main shutter 110, in a manner described below, so as to form a desired shutter aperture. With the above combination, the film 17 is advanced and the shutters 110, 120 are rotated at synchronous speeds. Total film exposure is thereby determined by the combination of aperture size and the film speed.

Figure 5:
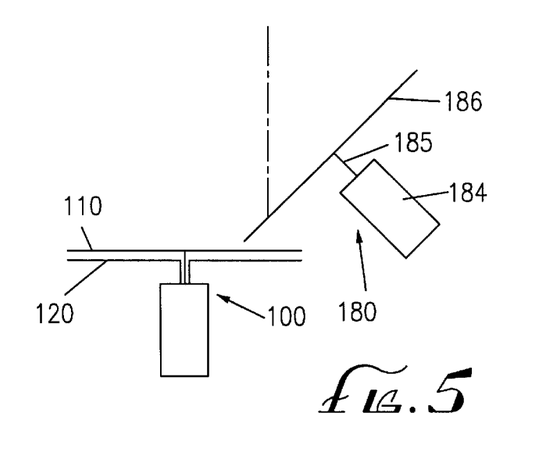
FIG. 5 is a diagrammatic view illustrating relative positions of a shutter assembly and a mirror assembly according to the system of FIG. 1.

The camera may include an optical viewfinder 18. The image is directed to the viewfinder 18 while the shutter is closed. This alternating image transfer may be accomplished by employing a rotating mirror (the front surface of the mirror is reflective to direct the image to the viewfinder 18). Alternately as illustrated, a separate mirror assembly 180 may be provided upstream of the shutters 110, 120 (see FIGS. 1 and 5). A rotating mirror 186, driven by a motor 184, is positioned at a 45° angle to the incoming light, the rotating mirror having a shutter and aperture shape similar to that of the main shutter 110 in the fully open position. The mirror 186 is aligned with the main shutter 110 such that when the main shutter closes off the opening, the reflective elements of the mirror 186 reflect the image into the viewfinder 18 allowing the scene to be simultaneously viewed during filming.

The rotating shutter assembly 100 includes a main shutter wheel 110 having a pair of opposing shutter elements 110a and 110b (see FIGS. 3A and 3B) extending radially outward therefrom. The main shutter wheel 110 rotates about an axis 5 at a speed corresponding to the rate at which the film is advanced, namely, one half of a revolution for each frame of film advanced. The extending main shutter elements 110a and 110b form arcuate apertures 112, 114 therebetween. An example size for a shutter combination used in the movie industry may have main shutter elements 110a and 110b with arcs of 80° leaving the arcuate apertures 112, 114 with arcs of 100°.

The adjustable shutter wheel 120 is positioned adjacent to and rotates coaxially with the main shutter wheel 110. The adjustable shutter wheel 120 has two opposed and radially extending shutter members 120a and 120b. The adjustable shutter wheel 120 will generally be rotated with the main shutter wheel 110, but the adjustable shutter wheel 120 may be adjusted to pivot relative to the main shutter wheel 110 thereby selectively extending over a portion of the arcuate apertures 112, 114 between the main shutter elements 110a and 110b. The size of the aperture and the rotational speed of the shutter determines film exposure.

Figure 4:
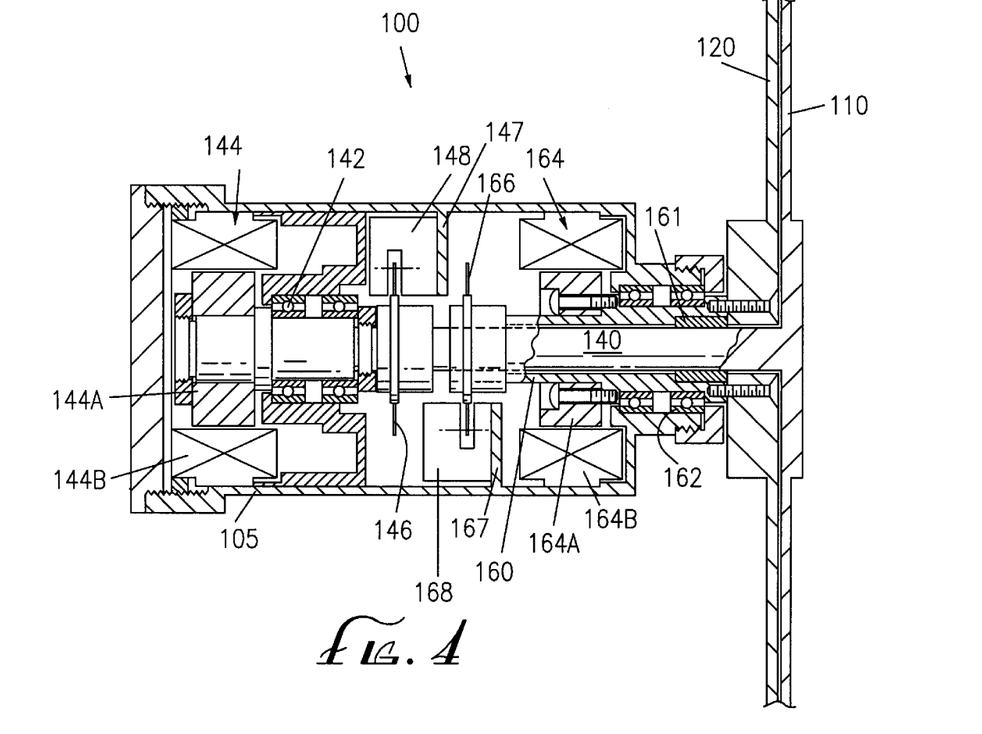
FIG. 4 is a detailed cross sectional view of a preferred shutter adjustment mechanism for use in the system of FIG. 1.

The main shutter wheel 110 is mounted on a main shaft 140 which is driven by main drive motor 144. The main drive motor 144 is mounted to the casing 105. The main shaft is rotatably mounted to the drive casing 105 via bearings 142. The motor 144 is preferably a brushless motor having a permanent magnet rotor 144a and outer stator windings 144b (see FIG. 4). The adjustable shutter wheel 120 is mounted on a secondary shaft 160 is mounted on a secondary shaft 160 which is driven by secondary drive motor 164. The secondary shaft 160 is rotatably mounted to the drive casing 105 via bearings 162. The motor 164 is preferably a brushless motor having a permanent magnet rotor 164a and outer stator windings 164b mounted to the casing 105. The motors 144 and 164 are preferably of the same specifications (i.e. same size, rating etc.) which may facilitate speed synchronization. A preferred is available from Sierracin Magnedyne Corporation of Vista, Calif. having a four pole, 0.8 oz-in maximum breakaway torque, 1.6 in outer diameter, 0.6 in length.

If additional quiet motor operation is desired, the motors may be modified or designed to include supplemental vibration and noise reduction features, such as for example the O-ring systems described in U.S. Pat. No. 5,235,227.

The motors have independently adjustable speed controls, the motor speeds being controlled by a controller 170 shown as a digital signal processor which sends signals to the motors via respective amplifiers 172, 174. The secondary shaft 160 is tubular in shape allowing the primary shaft 140 to be concentrically positioned therewithin.

The adjacent, touching surfaces of the shafts (one or both of the surfaces, namely the outer surface of the inner shaft 140 and the inner surface of the outer shaft 160) are preferably surface treated to minimize friction and wear between contacting surfaces. The preferred surface treatment is magnedized surfacing (a dry lubrication surface treatment) such as available from General Magnaplate of Ventura, Calif. Alternately a suitable teflon coated surface or polymer coated surface may be employed. Such self-lubricating systems are preferred so as to avoid introducing contaminants into the casing. If spacing permits, additional bearings may be provided between the two shafts. For example in a preferred construction, the shutter assembly 100 includes a polymer bearing 161 between shafts 140, 160 to minimize friction therebetween. The polymer bearing is essentially a one piece sleeve or journal which provides low friction rotational support between the shafts 140, 160. The sleeve material preferably has low moisture absorption and low thermal expansion. Alternately, separate bearing supports may be provided to allow independent support for the shafts to eliminate any contact therebetween. Since the shafts are typically rotating together at the same speed, generally there is no friction created therebetween. Relative movement and thereby friction is only experienced when adjusting the aperture. The total adjusting movement is only a matter of a few degrees, generally less than ¼ rotation, so surface coatings should provide adequate lubrication.

Both the primary shaft 140 and the secondary shaft 160 are equipped with angular speed and position detection devices. An encoder disk 146 is mounted onto the primary shaft 140; an optical encoder 148 mounted to the casing 105 via encoder bracket 147 detects both the speed and position of the shaft 140 and therefore the speed and position of the main shutter 110. Similarly, an encoder disk 166 is mounted onto the secondary shaft 160; an optical encoder 168 mounted to the casing 105 via an encoder bracket 167 detects both the speed and position of the shaft 160 and therefore the speed and position of the adjustable shutter 120. The mounting brackets 147, 167 may be constructed as part of the casing 105 as shown. Though separate brackets are illustrated, the encoders 148, 168 may alternately be mounted on a common mounting bracket. Signals (preferably digital) from the encoders 148, 168 representing the speed and position of the shutters 110, 120 are sent to the processor 170.

Figures 2, 3A, 3B:
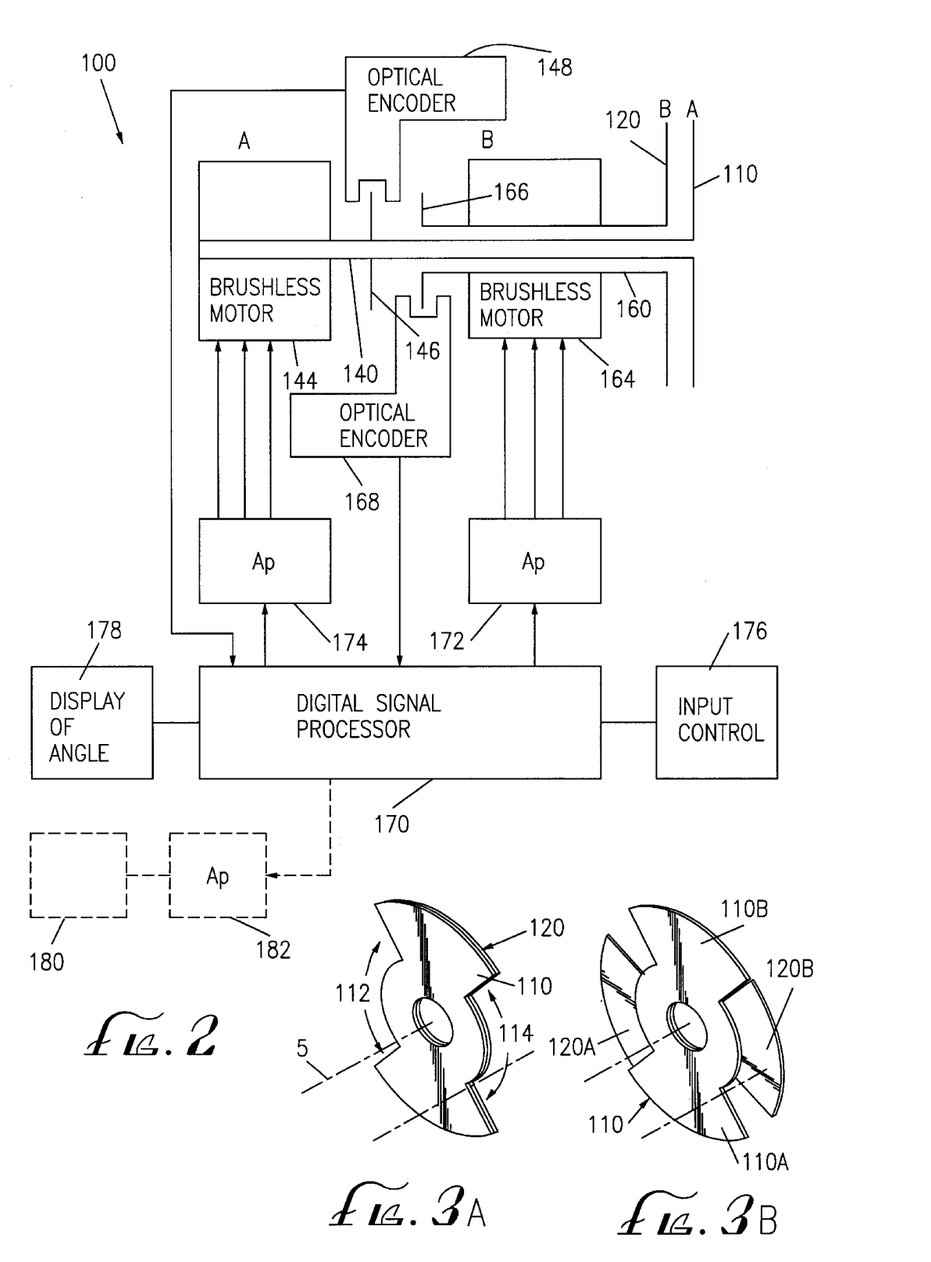
FIG. 2 is a schematic illustrating a preferred shutter adjustment mechanism for use in the system of FIG. 1.
FIGS. 3A and 3B are perspective views of a pair of shutter wheels as viewed from the lens side, FIG. 3A illustrating the shutters in the completely open position, FIG. 3B illustrating the shutters in the closed position.

The controller 170 also receives positioning and speed data from the rotating mirror assembly 180 and from the film advance mechanism 12. The controller 170 controls both the speed and the position of all the drive aspects of the camera including the film advance mechanism, the rotating mirror assembly, and the shutter motors 144, 164. As shown in FIG. 2 the controller sends control signal via amplifier 182 to the mirror assembly 180. The mirror motor 184 is preferably provided with an encoder disc on its drive shaft 185 and an optical encoder (not shown) to provide the position and speed data to the controller 170.

Normally the motors 144, 164 are set to run at the same speed. Setting the same speeds for both of the motors is simplified by selecting motors of the same size and specifications. If an adjustment of the size of the aperture is desired (i.e., if the position of the adjustable shutter 120 is needed to be adjusted relative to the main shutter 110) the controller either speeds up or slows down one or both of the motors 144, 164 for a given length of time. The encoder discs 146, 166 are provided with 3600 marks per rotation, i.e., every 0.1 degrees. As such, the optical encoders 148, 168 provide precise speed and position data to the controller 170 to allow precise adjustment of the shutter apertures 112, 114 relative to each other and relative to the film advance mechanism 12 and the rotating mirror 186.

Suitable position/speed detection devices may also be provided to detect the speed and position of the film advance mechanism and/or the rotating mirror 186.

The controller 170 is preferably a digital signal processor which may comprise a microprocessor mounted on a printed circuit board. A control signal such as from shutter position input control 176 may be transmitted to the controller 170 to adjust the shutter aperture. The input control may be an actuator which is manually operated by the camera operator or an electronic signal from a computerized control system. The processor 170 may also output a position signal to a display 178 (illustrated as an LCD display panel) which provides a readout of the shutter angle (i.e. shutter aperture).

Since it is difficult to synchronously spin two motors in series with high precision, the encoders 144, 164 are preferably analog sinusoidal, "infinite resolution" encoders such as available from Computer Optical Products, Inc. of Chatsworth, Calif. The sine wave encoders detects the slope of the curve to better determine and control instantaneous position and instantaneous velocity. As opposed to digital (square wave) encoders where no information is available between transitions, the sine wave encoder supplies continuous information about the angular position of the system with a resolution restricted only by the digitizing electronics. The sine wave encoder and the 3600 mark encoder disk combine to produce precise angular position and velocity data.

The multiple motor design may eliminate the need for gears potentially reducing noise, vibration, and/or power consumption. In addition, as opposed to other systems, the multiple independent motor system may provide for higher shutter speeds, corresponding to film speeds of 150–180 frames per second or possibly higher.

Figure 6:
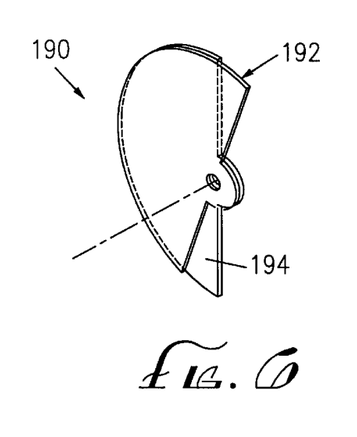
FIG. 6 is a perspective view of a preferred shutter wheel configuration as viewed from the lens side.

FIGS. 1–4 illustrate one embodiment for the shutter assembly 100, but other configurations may be employed. FIG. 6 illustrates a preferred shutter wheel pair 190 comprising a main shutter 192 and an adjustable shutter 194, each shutter only having a single shutter element. Unlike the previous embodiments, the shutter wheels 192, 194 are not symmetrical and therefore require counterbalance during rotation. The shutter wheels are balanced by installation of balancing weights on the wheels opposite to the shutter elements. These single aperture shutters must be run at twice the speed as the double aperture shutters but having only one aperture are simpler to control.

Figure 7:
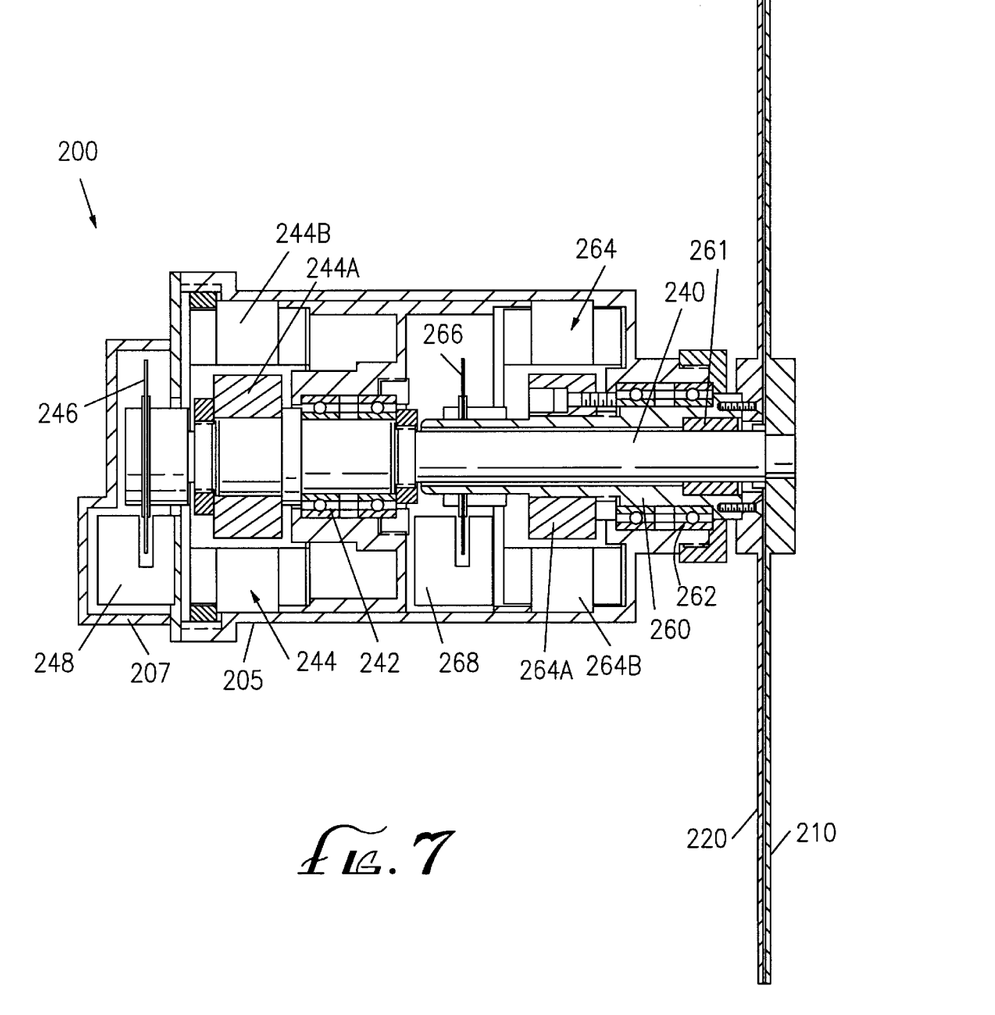
FIG. 7 is cross sectional view of an alternate shutter adjustment system.

FIG. 7 illustrates an alternate shutter assembly 200. The shutter assembly 200 is similar to the assembly 100 of FIGS. 1–4 except the encoder 248 and encoder disk 246 are located external to the primary motor 244. Main shutter 210 is mounted to the primary shaft 240 and the adjustable shutter is mounted to the secondary shaft 260. The shutters 210, 220 are of the same configuration as the shutters in FIGS. 3A, 3B or alternately may be configured as the shutters in FIG. 6. The primary shaft 240 is supported on the casing 205 via bearings 242 and the tubular secondary shaft 260 is supported on bearing 262. The secondary shaft is driven by motor 264. A polymer bearing 261 is disposed between the primary shaft 240 and the secondary shaft 260.The encoder disk 266 is mounted to the secondary shaft 260 and its angular speed and position determined by the optical encoder 268. The primary shaft 240 extends outward of the casing 205 to accommodate the encoder disk 246 and optical encoder 248. A casing end cap 207 covers and protects the encoder 248. The encoders 248 and 268 provide the speed and positioning signals to the controller as in the previous embodiment.

Figure 8:
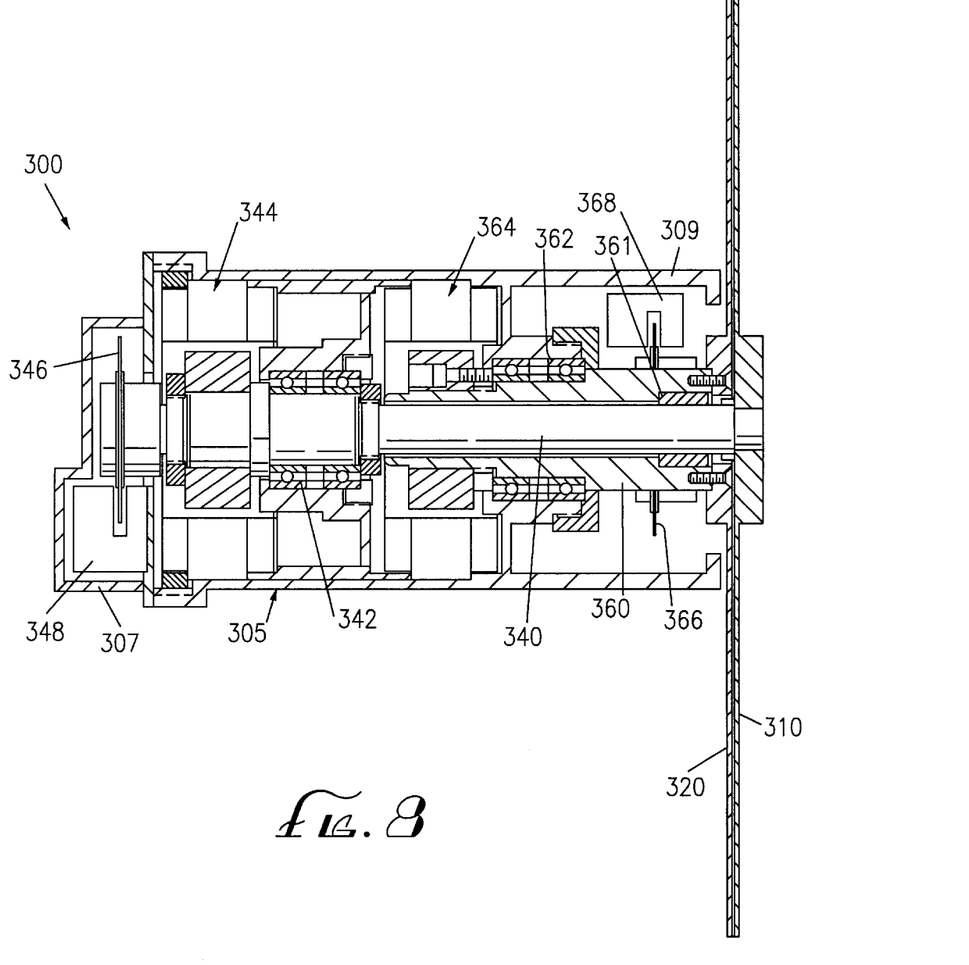
FIG. 8 is cross sectional view of another alternate shutter adjustment system.

FIG. 8 illustrates an alternate shutter assembly 300. The shutter assembly 300 is similar to the assembly 200 of FIG. 7 except the encoder 368 and encoder disk 366 are located external to the secondary motor 364 outside the casing 305 adjacent the shutter wheels 310, 320. Main shutter wheel 310 is mounted to the primary shaft 340 driven by primary motor 344 and the adjustable shutter 320 is mounted to the secondary shaft 360 (driven by secondary motor 364). The shutters 310, 320 are of the same configuration as the shutters in FIGS. 3A, 3B or alternately may be configured as the shutters in FIG. 6. The primary shaft 340 is supported on the casing 305 via bearings 342 and the tubular secondary shaft 360 is supported on bearing 362 and on polymer bearing 361. The secondary shaft is driven by motor 364. The encoder disk 366 is mounted to the secondary shaft 360 and its angular speed and position determined by the optical encoder 368. The primary shaft 340 extends outward of the casing 305 to accommodate the encoder disk 346 and optical encoder 348. A casing end cap 307 covers and protects the encoder 348. The secondary shaft 360 extends outward of the casing 305 to accommodate the encoder disk 366 and optical encoder 368. An extension cover portion 309 of the casing 305 encloses and protects the encoder 368. The encoders 348 and 368 provide the speed and positioning signals to the controller as in the previous embodiment.

Each of the previous embodiments is illustrated with dual shutter arrangements (a main shutter and an adjustable shutter), but other configurations may be employed. U.S. Pat. No. 4,889,424, herein incorporated by reference, in addition to dual shutter wheel arrangements, also discloses multiple shutter wheel embodiments having a main shutter and two adjustable shutters. Such multiple adjustable shutter wheel arrangements may also be employed in the shutter assemblies of the present invention.

Figure 9A:
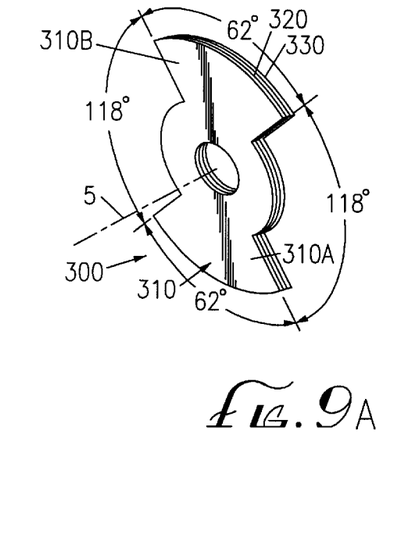
FIGS. 9A and 9B are perspective views of an alternate design for shutter wheels as viewed from the lens side, FIG. 9A illustrating the shutters in the completely open position, FIG. 9B illustrating the shutters in the closed position.
Figure 9B:
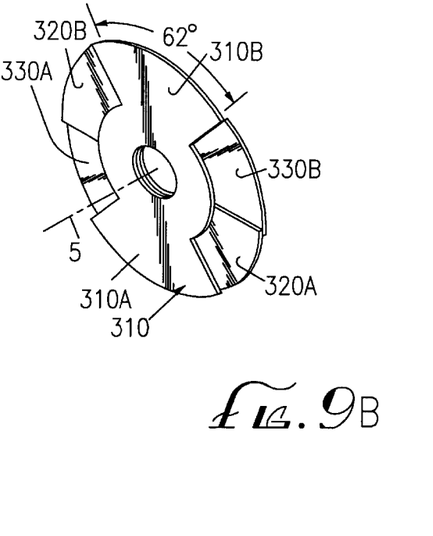

FIGS. 9A and 9B illustrate perspective views of one such shutter wheel combination 300 having multiple adjustable shutters 320, 330. This shutter combination 300 is comprised of a main shutter wheel 310 having a pair of opposing shutter elements 310a and 310b extending radially outward therefrom. The main shutter wheel 310 rotates on a shaft about an axis 5 at a speed corresponding to the rate at which the film is advanced. The extending main shutter elements 310a and 310b form arcuate apertures therebetween. Each of the arcs of the shutter elements 310a and 310b are about 62° leaving arcuate apertures of 118°.

Adjacent to and rotating coaxially with the main shutter wheel 310 are the two adjustable shutter wheels 320 and 330. The adjustable shutter wheel 320 has two opposed and radially extending shutter members 320a and 320b and the adjustable shutter wheel 330 has two similar extending shutter members 330a and 330b. Both the shutter members 320a and 320b have arcs of about 62° leaving arcuate apertures with arcs of 118°. Similarly the shutter members 330a and 330b also have arcs of about 62° leaving arcuate apertures of 118°.

The main shutter wheel 310 is mounted to the primary shaft. The adjustable shutter wheels 320 and 330 are connected by gearing to the outer shaft in a manner as described in the U.S. Pat. No. 4,889,424 patent. The secondary motor rotates the secondary shaft coaxially with the main shutter wheel 310, but they may be adjusted to pivot relative to the main shutter wheel 310 thereby selectively extending over a portion of the arcuate apertures between the main shutter elements 110a and 110b. The adjustable shutter wheels 320 and 330 pivot in opposite angular directions in order to close off a portion of the arcuate apertures between the main shutter elements 310a and 320b in substantially equal amounts from each side. Since the main shutter wheel 310 has the main shutter elements 310a, 310b and extending shutter members 320a, 320b and 330a, 330b all of the same arcuate size, the size of the main shutter elements 310a and 310b can be minimized yet maintaining the capability of completely closing off the apertures as in FIG. 15b. The 62° arc is chosen to provide a 2° overlap between shutter elements when complete closing off of the aperture opening is desired. The larger 118° aperture opening (as compared to the 100° aperture opening in the embodiment of FIG. 3A) allows for greater film exposure when desired.

Alternately, a separate motor, shutter shaft and encoder may be provided for driving each of the adjustable shutters 320, 330. The controller 170 then receives signals corresponding to the angular positions and speed of each of the shutters 310, 320, 330 and controls shutter aperture and shutter by controlling the speeds of each of the three shutter motors.

Since each of the shutter elements 320a, 320b, 330a and 330b extends 55° circumferentially, it is possible to completely close the 100° aperture opening. By providing this capability it is possible to completely fade or dissolve to black during filming of a scene, whereby the dual pivoting shutters 320 and 330 achieve another desirable filming operation.

Unlike the shutters 110, 120 shown in FIGS. 3A and 3B which only closes off the apertures in one direction between the opposing shutter elements 110a and 110b, the dual pivoting shutters 320 and 330 close off the arcuate apertures between the main shutter elements 310a and 310b in substantially equal amounts from each side. Therefore as the entire shutter assembly rotates, the center of the remaining aperture between main shutter elements 310a and 310b is unchanged no matter how far the adjustable shutter wheels 320 and 330 pivot toward closing off the aperture opening. Therefore, no adjustment to the synchronous control of the system need be made to compensate for the position of the aperture opening as the shutter assembly pivots. The shutter positioning achieved by the dual pivoting shutters 320 and 330 is particularly useful in certain filming techniques. It is noted that in the two shutter system according to FIGS. 1–4, compensation for the position of the aperture opening as the shutter assembly pivots may be made solely software control due to the multiple shutter motor configuration.

Figure 10A:
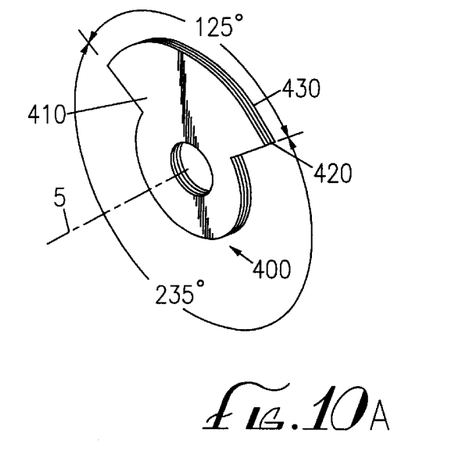
FIGS. 10A and 10B are perspective views of an alternate design for shutter wheels as viewed from the lens side, FIG. 10A illustrating the shutters in the completely open position, FIG. 10B illustrating the shutters in the closed position.
Figure 10B:
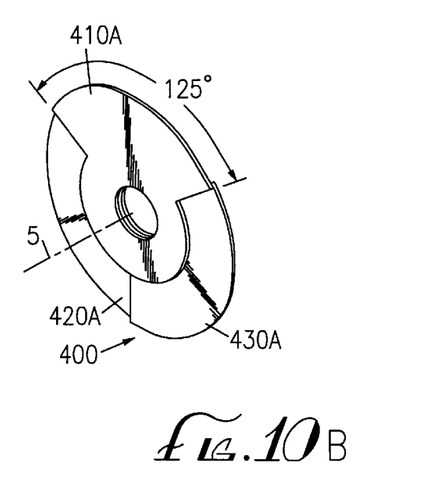

FIGS. 10A and 10B illustrate yet another alternative shutter 400. This shutter 400 is comprised of a main shutter wheel 410 and two adjustable shutter wheels 420 and 430 which are adjacent to and rotate with the shutter wheel 410. The main shutter wheel has one shutter element 410a extending radially outward therefrom thereby forming an arcuate aperture circumferentially adjacent to the element 410a. Choosing the arc of the main shutter element 410a to be 125°, the element 410a forms an arcuate aperture of 235°. The adjustable shutter wheel 420 has a radially extending shutter member 420a and adjustable shutter wheel 430 has a radially extending shutter member 430a. With the shutter members 420a and 430a having arcs of 125°, each adjustable shutter wheel would also have an arcuate aperture of 235°. By pivoting the adjustable shutter wheels 420 and 430 in opposite angular directions, the arcuate aperture of the main shutter wheel 410 may be partially closed off or as viewed in FIG. 10B entirely closed off.

Choosing the main shutter element 410a and the adjustable shutter members 420a and 430a to have arcs of 125° allows a 5° overlap between adjacent wheels when the shutter 400 is in the completely closed off position as in FIG. 10B.

Figure 11:
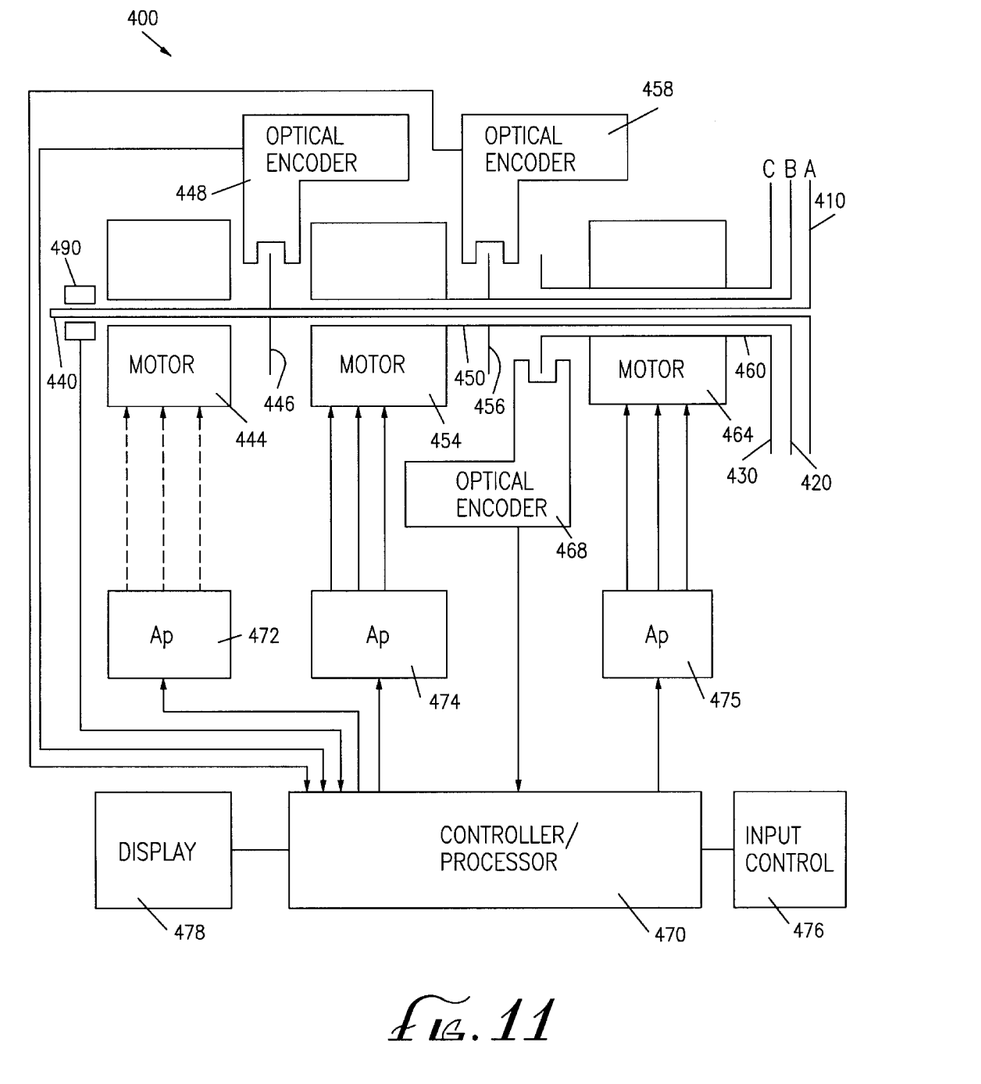
FIG. 11 is a schematic of an alternate shutter drive and control assembly for use with three shutter wheels.

FIG. 11 is a schematic of an alternate shutter drive and control assembly 400 for use with three shutter wheels such as in the embodiments of FIG. 9 or 10. Main shutter wheel 410 is mounted to the primary shaft 440, a first adjustable shutter 420 is mounted to a second shaft 450 and a second adjustable shutter is mounted to a third shaft 460. The shutters 410, 420, 430 may be of the same configuration as the shutters in FIGS. 9A, 9B or alternately may be configured as the shutters in FIGS. 10A, 10B. The primary shaft 440 and tubular second and third shafts 450, 460 are supported via suitable bearings on the casing. The primary shaft is driven by motor 444, the second shaft 450 is driven by motor 454 and the third shaft is driven by a third motor 464. The encoder disk 466 is mounted to the third shaft 460 and its angular speed and position determined by the optical encoder 468. The encoder disk 456 is mounted to the second shaft 450 and its movement and position determined by the optical encoder 458. The encoder disk 446 is mounted to the primary shaft 440 and its angular speed and position determined by the optical encoder 448. The encoders 448, 458 and 468 provide the speed and positioning signals to the controller 470 to allow control of the motors 444, 454, 464 by the controller/processor 470 via signals through respective amplifiers 472, 474, 475. The display 478 may provide a visible readout of shutter aperture position and/or shutter speed. Input control 476 allows for manual or other electronic input for setting the aperture and/or shutter speed.

Though independent speed control of each of the motors (in either the two motor or three motor embodiments) is the preferred system, other mechanisms may be employed. As shown in FIG. 11, the primary shaft 440 extends outward of the motor 444 to accommodate a brake 490. If it is desired to adjust the aperture, the brake 490 may be applied to slow the rotation of the shaft 440 for a given amount of time to change the relative angular position of the main shutter 410 relative to the second and third shutters thereby adjusting the aperture. Brakes may similarly be provided on each of the other shafts 450, 460. Using the brakes for position control may simplify motor speed control.

Thus, a shutter system for a movie camera or the like is disclosed which employees a multiple drive adjustable shutter system. While embodiments and applications of this invention have been shown and described, it would be apparent to those skilled in the art that many more modifications are possible without departing from the inventive concepts herein. The invention therefore is not to be restricted except in the spirit of the appended claims.

We claim:

1. A motion picture camera system comprising:
 a camera housing;
 a film advance mechanism for advancing film past a shutter opening;
 a shutter mechanism, comprising:
  a main shaft rotatably mounted to rotate about a first axis,
  a main shutter wheel mounted to the main shaft and having at least one radially extending main shutter element forming at least one arcuate aperture,
  a secondary shaft rotatably mounted to rotate about the first axis,
  a first adjustable shutter wheel mounted to the secondary shaft and positioned adjacent said main shutter wheel, said first adjustable shutter wheel having a same number of radially extending shutter members as the radially extending main shutter elements, a main shutter motor mounted on the housing, the main shutter motor being connected to and driving the main shaft, a secondary shutter motor mounted on the housing, the secondary shutter motor being connected to and driving the secondary shaft;

a third shaft;

a second adjustable shutter mounted on the third shaft; and a third motor for rotating the third shaft; and means for adjusting position of the first adjustable shutter wheel relative to the main shutter wheel for controlling speed of at least one of the secondary shutter motor and the main shutter motor.

2. A motion picture camera system according to claim 1 wherein said adjustable shutter wheel is arranged so as to adjustably rotate with respect to said main shutter wheel with said shutter member of said adjustable shutter wheel selectively closing off at least a portion of said arcuate aperture.

3. A motion picture camera system according to claim 1 further comprising means for controlling rotation of said main shutter wheel and said adjustable shutter wheel at a synchronous speed corresponding to advance rate of the film.

4. A motion picture camera system according to claim 1 wherein said main shutter wheel has two opposed main shutter elements.

5. A motion picture camera system according to claim 1 wherein said main shutter wheel has only one main shutter element.

6. A motion picture camera system according to claim 1 further comprising
a film magazine mountable to the camera housing;
a camera support head upon which the camera housing is mounted;
positioning mechanism for supporting and positioning camera support head.

7. A motion picture camera system according to claim 1 further comprising
a first optical encoder for determining speed and position of the main shutter wheel;
a second optical encoder for determining speed and position of the secondary shutter wheel;
a controller which uses speed and position information from the first and second optical encoders to control the speed of the main and secondary motors for setting aperture opening formed between the main shutter and the adjustable shutter.

8. A motion picture camera system according to claim 1 wherein the main shutter motor and the secondary shutter motor are the same size.

9. A motion picture camera system according to claim 1 wherein the means for adjusting position comprises a microprocessor which electronically sets the speed of at least one of the main shutter motor and the secondary shutter motor.

10. A motion picture camera system according to claim 1 wherein the secondary shaft is tubular and the main shaft is concentrically positioned within secondary shaft.

11. A motion picture camera system according to claim 10 further comprising
a first bearing assembly for rotatably mounting the main shaft to the camera housing;

a second bearing assembly for rotatably mounting the secondary shaft to the camera housing.

12. A motion picture camera system according to claim 11 wherein the secondary shaft is rotatably mounted on the main shaft and a means is provided between the main and secondary shafts for minimizing friction therebetween.

13. A system according to claim 11 wherein the secondary shaft is rotatably mounted on the main shaft, and a dry lubricant surface treatment is provided on contacting surfaces between the main and secondary shafts to minimize friction therebetween.

14. A motion picture camera system according to claim 1 further comprising
a first optical encoder for detecting position and speed of the main shutter wheel;
a second optical encoder for detecting position and speed of the first adjustable shutter wheel.

15. A motion picture camera system according to claim 14 wherein the first and second optical encoders comprise sinusoidal infinite resolution encoders.

16. A motion picture camera system according to claim 1 wherein the first and second motors are arranged in series.

17. A motion picture camera system according to claim 1 wherein the first motor is directly mounted to the main shaft and the second motor is directly mounted to the secondary shaft without intermediate gearing.

18. A motion picture camera system according to claim 1 further wherein the first and second shutter motors are positioned on a same side of the first and second shutter wheels.

19. A motion picture system according to claim 1 wherein the means for adjusting position comprises a brake which selectively slows rotation of one of the main shaft and the secondary shaft.

20. A method for exposing film in a movie camera comprising the steps of:
passing light through a lens opening onto the film;
positioning a main shutter wheel between the lens opening and the film for alternately interrupting and passing the light from the lens to the film by rotating the main shutter wheel having a radial element with a first motor to interrupt the light and an aperture for passing the light;
moving the film past the lens opening during interruption of the light;
positioning at least a first adjustable shutter wheel, having radially extending members, coaxially with and adjacent to the main shutter wheel;
rotating the first adjustable shutter wheel with a second motor at a same speed as that of the first motor; and
controlling exposure of the film by closing off portions of the apertures between said main shutter elements by moving said radially extending members of the adjustable shutter wheel members into the aperture,
wherein the step of controlling exposure comprises:
positioning a second adjustable shutter wheel, having radially extending members, coaxially with and adjacent to the main shutter wheel between the main shutter wheel and the first adjustable shutter wheel;
rotating the second adjustable shutter wheel to rotate at the same speed as the first adjustable shutter wheel;
adjusting relative angular position of the first and the second adjustable shutter wheels relative to the main shutter wheel so as to close off portions of the aperture, the first and second adjustable shutter wheels being adjusted in opposite directions about the aperture, wherein the second adjustable shutter is rotated by a third motor.

21. A method according to claim 20 further comprising the step of independently controlling the first and second motors.

22. A method according to claim 20 further comprising the step of
positioning the first and second shutter motors on a same side of the first and second shutter wheels.

23. A method according to claim 20 further comprising the steps of
mounting the main shutter wheel on a first shaft;
positioning a second shaft concentrically within the first shaft;
mounting the first adjustable shutter wheel on the second shaft.

24. A method according to claim 20 further comprising the step of positioning the first and second shutter motors on a same side of the first and second shutter wheels.

25. A method according to claim 20 wherein the speed of at least one of said first and second electric motors is controlled by using a brake.

* * * * *